April 24, 1934. A. C. FLOTHOW 1,956,016
ELECTRIC TIRE NUMBERING DISK
Filed Jan. 29, 1932   2 Sheets-Sheet 1
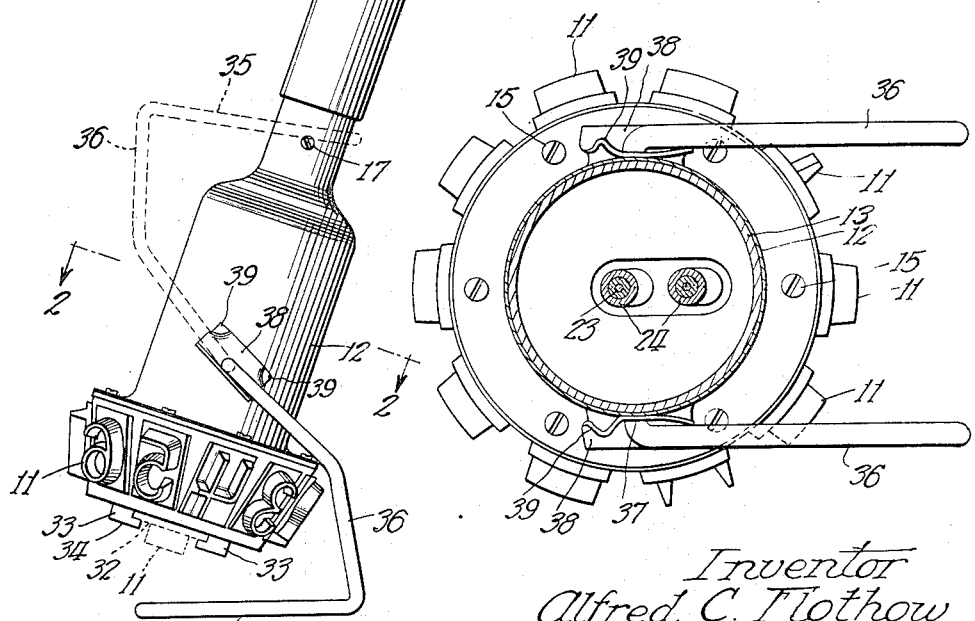

April 24, 1934. A. C. FLOTHOW 1,956,016
ELECTRIC TIRE NUMBERING DISK
Filed Jan. 29, 1932 2 Sheets-Sheet 2
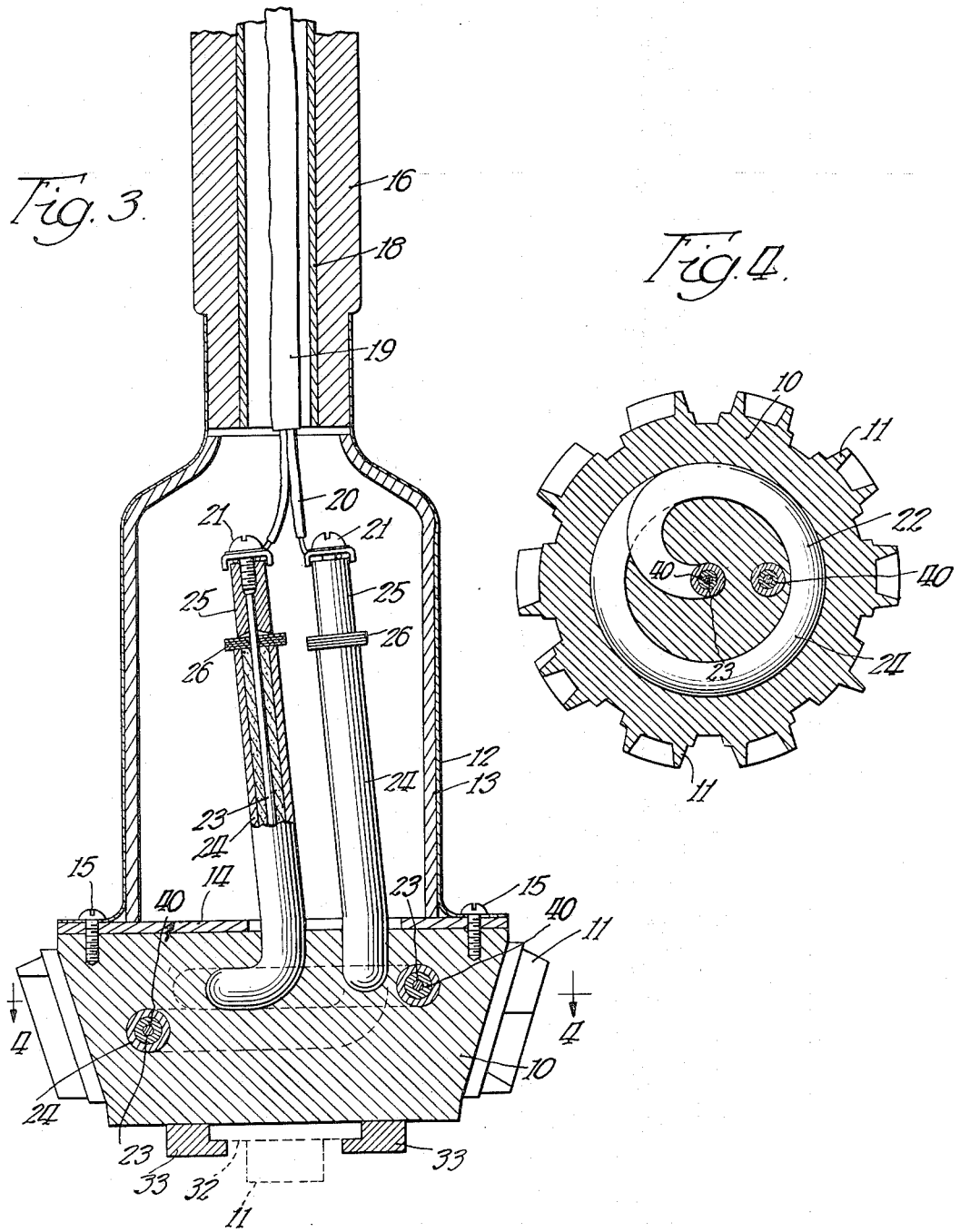
Witness
Victor Siljander
Inventor
Alfred C. Flothow
Ernest E. Infer Atty.

Patented Apr. 24, 1934

1,956,016

UNITED STATES PATENT OFFICE 1,956,016

ELECTRIC TIRE NUMBERING DISK

Alfred C. Flothow, Maywood, Ill., assignor to Everhot Manufacturing Company, Maywood, Ill., a corporation of Illinois Application January 29, 1932, Serial No. 589,634

4 Claims. (Cl. 219—30)

My invention relates to branding or marking devices and more particularly it relates to a device having raised figures connected with suitable heating means whereby application of the figures to the surface of an article to be marked produces permanent grooves or depressions taking the form of the desired figures or characters. More particularly the invention relates to a device suitable for melting or devulcanizing of rubber articles at points of contact of the characters therewith to produce depressions corresponding to the desired figures or characters.

The invention has an important application in connection with the branding or marking of rubber tires for vehicles such as automobiles, trucks or busses. Transportation and other companies operating a large number of busses or trucks find it desirable to determine the total mileage life of the tires with which their vehicles are equipped. The accurate recording of the mileage for the individual tires makes it desirable that the tires be permanently marked with identifying characters of a depth and size such as not to be obliterated by age or the action of the elements.

It is an object of the invention to provide an improved branding device of the kind described suitable for producing indentations in the body of the tire by melting or devulcanizing the rubber to form characters by applying suitable preheated raised characters to the surface of the tire where such indentations are to be provided.

Another object of the invention is the provision of a novel branding device including a metallic disk having a heating element embedded or cast therein and so arranged as to insure perfect thermal conduction from the whole surface of the element.

Still another object of the invention is the provision of a heating element so arranged and constructed as to minimize the variation of expansion and contraction and thereby prolong its service life.

A further object of the invention is the provision of a branding or marking device of the kind described which is simple, durable, reliable, efficient, and satisfactory for its intended purpose.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts, Fig. 1 is an elevational view of a device embodying the principles of the invention;

Fig. 2 is a view along the line 2—2 of Fig. 1 drawn to a larger scale;

Fig. 3 is a longitudinal sectional view of a portion of the device drawn to a still larger scale; and Fig. 4 is a sectional view along the line 4—4 of Fig. 3 drawn to a smaller scale.

Referring now more particularly to the drawings, the device is shown as comprising a metallic disk 10 having a plurality of raised characters or projections 11 formed on its outer periphery. The characters 11 may be of any desired shape or outline and in the device shown and described the characters form indentations in the rubber corresponding to the digits or arabic numerals.

The disk 10 is manipulated by means of a longitudinally projecting member comprising a housing 12 and a handle 16. The housing 12 is preferably of a generally cylindrical shape and has a lining of heat insulating material 13 such as asbestos or the like. The lower end of the housing 12 terminates in an annular flange separated from the disk 10 by means of a plate 14 of asbestos or other similar heat insulating material. The housing 12 is fastened to the disk 10 by a plurality of screw bolts 15.

The handle 16 is hollow and may be constructed of wood or other suitable material. The end portion of the handle 16 is offset and closely fits within the upper tapered end portion of the housing 12 and is fastened to the housing by a plurality of screws 17. The inner periphery of the handle 16 has a closely fitting cylindrical lining 18 through which extends a cord 19 including a pair of conductors 20.

The cord 19 extends through the handle member 16 and has a projecting portion of any desired length adapting the device to be connected with a source of electrical energy by means of a socket plug 31. A sleeve 27 forms a projecting terminus of the cylindrical lining 18. A spiral spring 29 is mounted on the cord 19 adjacent the sleeve 27 to reenforce the cord and minimize stresses to which the flexible cord would otherwise be subjected at its point of connection with the rigid handle member 16. One end of the spring 29 bears against the sleeve 27 and the other end has compressive engagement with a clamp 28 adjustably mounted on the cord 19, the spring thereby also serving to keep taut that portion of the cord 19 within the handle 16.

The disk 10 and the raised characters 11 are heated by means of a tubular element 22 embedded or cast within the disk and having its ends projecting to operatively connect the conductors 20 by means of insulated terminals 25. The element 22 consists of an inner resistance wire 23 surrounded by a tubular metal casing 24. The casing 24 is filled with dielectric material 40 such as manganese oxide which provides insulation to the wire 23. The tubular element 22 can be shaped or bent as desired and is preferably arranged in the form of a coil of substantial length about which the disk 10 is cast and thereby insures perfect thermal conduction from the whole surface of the element. The embedding of the element 22 in the disk 10 as described minimizes or prevents variations in expansion and contraction of the element which if permitted to occur would shorten its life. The ends of the resistance wire 23 are connected with the insulated terminals 25 upon the outer ends of which binding posts 21 are provided to fasten the ends of the conductors 20 and thereby complete the electrical circuit through the resistance wire 23. A ring 26 of mica or other suitable insulating material separates the ends of the terminals 25 from the end of the dielectric material 24 surrounding the resistance wire 23.

Means is provided for adapting the device for heating detachable characters 11 as well as the characters 11 which are integrally formed on the disk 10. For this purpose I have provided on the exposed face of the disk 10, a pair of parallel members 33 having inturned flanges 34, both integrally formed with the disk. Any one of a plurality of plates 32 are insertable in the space between the members 33 with one face of the plate in direct contact with the disk 10. A plurality of such plates 32 may be used each having a different raised character 11 and the contact between the plate and the disk heats the character 11 sufficiently to melt or devulcanize material with which the character is brought into contact. The use of removable plates 32 adapts the device for heating a great variety of characters to a temperature suitable for branding articles as described.

A member 35 provides a support for the device in the substantially vertical position of Fig. 5. The member 35 may be formed from heavy wire or small rod material capable of being bent to make U-shaped the lower portion, which contacts with the floor or ground. The adjoining end portions form upwardly extending arms 36 terminating in inturned end portions 37. The end portions 37 pivotally engage a pair of members 38 fastened to opposite sides of the housing 12 by welding or the like. The members 38 are L-shaped in cross section with one leg having its corners 39 turned to provide stops tending to hold the member 35 in either its full line or dotted line position of Fig. 1. The lowermost bent corner 39, as observed in Fig. 1, prevents the device from tilting of its own weight about the pivots 37 and enables the device to be maintained in the upright position shown. In operating the device the member 35 is moved to the dotted line position where it is entirely above the disk and permits any desired portion of the disk to be applied to the surface to be branded. The corners 39 are sufficiently rigid to hold the member 35 in either its full line or dotted line position and is sufficiently flexible to yield under pressure and permit the member to be moved from its full line to its dotted line position. The device can also be supported in substantially horizontal position when the member is in its dotted line position. In either position of the member 35 the disk 10 is maintained out of contact with the floor which is desirable if the disk is hot. By holding the device vertical the sides of the tire may be branded and by holding it in horizontal position the upper or inner portions of the tire may be provided with suitable numerals.

Thus it will be seen that I have provided a branding device especially adapted for marking automobile tires and similar articles of rubber material and having novel means for heating the device by energizing the resistance coil embedded in a metallic disk upon which there are raised characters adapted to be heated to the point where they will melt or devulcanize the rubber.

Having thus described my invention, it is obvious that various immaterial modifications may be made in the same without departing from the spirit of my invention; hence, I do not wish to be understood as limiting myself to the exact form, construction, arrangement and combination of parts herein shown and described or uses mentioned.

What I claim as new and desire to secure by Letters Patent is:

1. In a device of the kind described, a cast member having a raised character integrally formed thereon, a longitudinal member projecting from and adapted as a handle for the cast member, means operable to heat said cast member and raised character, said means including a tubular element having its main portion encased in said cast member with its ends projecting into said longitudinal member, said element having an inner resistance coil encased in dielectric material, a pair of conductors terminating in said longitudinally extending member, a pair of terminals respectively connecting the conductors with the ends of said resistance coil, and a member pivotally mounted on said longitudinal member adapted as a support for the device in either vertical or horizontal positions.

2. In a device of the kind described, a cast member having a plurality of raised characters integrally formed on its outer periphery, a longitudinal member projecting from and adapted as a handle for said cast member, means operable to heat said cast member and raised characters, said means including a tubular element having its main portion encased in said cast member with its ends projecting into said longitudinal member, said element having an inner resistance coil encased in dielectric material, a pair of conductors terminating in said longitudinal member, a pair of insulated terminals respectively connecting the conductors with the ends of said coil, and a member pivotally mounted on the longitudinal member adapted as a support for the device in either vertical or horizontal positions.

3. In a device of the kind described, a disk-shaped member of heat conducting material having a plurality of raised characters integrally formed on its outer periphery, a longitudinally extending member projecting from one face of the disk-shaped member providing a handle for the device, insulating means separating said handle and disk-shaped member, means operable to heat said disk-shaped member and raised characters, said means including a tubular element having its main portion encased in said disk-shaped member with its ends projecting into said handle member, said tubular element comprising an inner resistance coil encased in dielectric material, a pair of conductors terminating in said handle member, a pair of insulated terminals respectively connecting the conductors with the ends of said coil and means on the exposed face of the disk-shaped member adapted as a mounting for a plurality of raised characters to be selectively attached to the exposed face of the disk-shaped member, and a member pivotally mounted on the longitudinal member adapted as a support for the device in either vertical or horizontal positions.

4. In a device of the kind described, a resistance coil encased in dielectric material, a metal disk cast about said coil and providing raised characters on its outer periphery, a handle member mounted on one side of the disk, conductors connected with said coil extending through said handle member, and a member pivotally mounted on the longitudinal member adapted as a support for the device in either vertical or horizontal positions.

ALFRED C. FLOTHOW.